(12) United States Patent
Rapp et al.

(10) Patent No.: US 8,189,258 B2
(45) Date of Patent: May 29, 2012

(54) OPTICAL AMPLIFIER CONFIGURATION

(75) Inventors: Lutz Rapp, Deisenhofen (DE); Dario Setti, München (DE)

(73) Assignee: Nokia Siemens Network Oy, Espoo (FI)

( * ) Notice: Subject to any disclaimer, the term of this patent is extended or adjusted under 35 U.S.C. 154(b) by 383 days.

(21) Appl. No.: 12/478,161

(22) Filed: Jun. 4, 2009

(65) Prior Publication Data

US 2009/0303577 A1    Dec. 10, 2009

(30) Foreign Application Priority Data

Jun. 6, 2008    (EP) .................................... 08104279

(51) Int. Cl.
*H04B 10/17*    (2006.01)
(52) U.S. Cl. .............................. 359/341.33; 359/341.32
(58) Field of Classification Search ............. 359/341.32, 359/341.33
See application file for complete search history.

(56) References Cited

U.S. PATENT DOCUMENTS

| | | | |
|---|---|---|---|
| 5,978,130 A * | 11/1999 | Fee et al. ................... | 359/341.32 |
| 6,335,823 B2 * | 1/2002 | Ohshima et al. .......... | 359/341.32 |
| 6,452,718 B1 | 9/2002 | Augustsson | |
| 6,580,552 B2 * | 6/2003 | Welch ....................... | 359/341.32 |
| 6,697,193 B1 | 2/2004 | Meli et al. | |
| 6,941,079 B1 | 9/2005 | Barozzi et al. | |
| 6,980,576 B2 * | 12/2005 | Frolov et al. ............... | 372/38.06 |
| 7,330,303 B2 * | 2/2008 | Sato et al. ................. | 359/341.41 |
| 2001/0008459 A1 * | 7/2001 | Ohshima et al. ......... | 359/341.44 |
| 2003/0039027 A1 | 2/2003 | Welch | |
| 2003/0113067 A1 * | 6/2003 | Koh et al. ................... | 385/48 |

FOREIGN PATENT DOCUMENTS

| | | |
|---|---|---|
| WO | 0024148 A1 | 4/2000 |
| WO | 2004095751 A1 | 11/2004 |

OTHER PUBLICATIONS

European Search Report dated Nov. 12, 2008.

* cited by examiner

*Primary Examiner* — Eric Bolda
(74) *Attorney, Agent, or Firm* — Laurence A. Greenberg; Werner H. Stemer; Ralph E. Locher

(57) ABSTRACT

An optical amplifier configuration for WDM (wavelength division multiplex) systems uses a common pump source connected to an input of an optical splitter deploying pump light via variable optical attenuators to a plurality of optical amplifiers. Control circuits determine individually the output powers of the amplifiers by varying the attenuations of the variable optical attenuators. Amplifier units based on PLC technology are implemented to reduce the size.

8 Claims, 4 Drawing Sheets

OPTICAL AMPLIFIER CONFIGURATION

CROSS-REFERENCE TO RELATED APPLICATION

This application claims the priority, under 35 U.S.C. §119, of European patent application EP 08 104 279, filed Jun. 6, 2008; the prior application is herewith incorporated by reference in its entirety.

BACKGROUND OF THE INVENTION

Field of the Invention

The invention relates to an optical amplifier configuration for WDM systems with a plurality of optical amplifiers.

Erbium Doped Fiber Amplifiers are widely deployed in optical Dense Wavelength Division Multiplexing transmission systems due to their capability to amplify all signals of a DWDM (Dense Wavelength Division Multiplex) signal simultaneously in an almost ideal manner. Furthermore, EDFAs represent key components for the integration of point-to-point links in optical networks. This trend results in an increased number of amplifiers used in an optical network due to the additional losses introduced by switches, multiplexer etc. Further, optical networking technology has become attractive for regional and metropolitan networks with stringent cost requirements. Therefore, reducing amplifier cost without sacrificing functionality is a key requirement for EDFAs. The core of an EDFA is given by the gain medium, i.e. the erbium doped fiber, that provides the amplification, and by the laser pumps, that provide the power to allow that a sufficient part of the dopant ions in the erbium doped fiber leave the ground state to reach the desired excited state level.

Practical implementations of EDFAs deploy additional passive components such as tap couplers, signal monitors, WDM couplers to couple the pump radiation and the signal light into the EDF, isolators, etc, too.

Nowadays, broad-band EDFAs are used to amplify the DWDM aggregate (up to 80 channels) generated at the transmitter side as well as to compensate the losses due to the propagation and dispersion compensating fibers in the link. In addition, a broad-band EDFA is used in front of the demultiplexer to compensate the losses at the receiver side. However, this configuration is used for links with bit-rates up to 10 Gbit/s, whereas at higher bit rates (40 Gbit/s and beyond) tighter tolerances to propagation impairments impose the deployment of additional components causing additional loss at the receiver side. For example, the requirements on residual chromatic dispersion can be fulfilled by considering a Tuneable Dispersion Compensator, whereas signal degradation due to Polarization Mode Dispersion can be avoided by means of a PMD Compensator. However, these devices act on single channels rather than on the WDM aggregate, so that TDCs and PMDCs have to be considered at the receiver side. In addition, modulation formats (such as Differential Phase Shift Keying) for high bit rate transmission are characterised by a more complex receiver structure and therefore require high optical signal power at the input. All these factors lead to the need of an additional single channel EDFA placed for each propagating channel in an optical path after the demultiplexer to compensate for the losses. As a result, the amplification costs are proportional to the channel load.

Typically, single channel EDFAs are based on discrete components. In particular, each amplifier comprises one or more dedicated laser pumps, i.e. the optical power provided by these pumps is used for the amplification of a specific channel. As a result, the number of pumps deployed after the demultiplexer is proportional to the number of channels, so that at high channel load this solution appears very expensive.

Furthermore, for the approach based on discrete components the mechanical size of the single channel EDFA is fixed. For each channel at the receiver, the same footprint has to be reserved for the amplification. Thus, it is concluded that the footprint to be reserved for the amplification process after the demulti-plexer is proportional to the number of channels. As a consequence, this solution does not allow for compactness for optical networks operating at high channel load.

SUMMARY OF THE INVENTION

It is accordingly an object of the invention to provide an optical amplifier configuration, which overcomes the above-mentioned disadvantages of the heretofore-known devices and methods of this general type and which provides for a low cost amplifier configuration for DWDM systems.

With the foregoing and other objects in view there is provided, in accordance with the invention, an optical amplifier configuration for wavelength division multiplex systems with a plurality of optical amplifiers. The configuration comprises:
an optical splitter having an input and a plurality of outputs;
a common pump source connected to the input of the optical splitter;
variable optical attenuators;
a plurality of optical amplifiers having pump signal inputs connected via the optical attenuators to the outputs of the optical splitter respectively; and
control circuits connected to receive control signals from the amplifiers and controlling output powers of the variable optical attenuators and therefore pump signals of the amplifiers.

In accordance with an added feature of the invention, there is provided at least one additional optical splitter, whose input is connected to at least a second pump source and whose outputs are connected to pump signal inputs of further amplifiers.

In accordance with again an added feature of the invention, there is provided a splitter with at least two inputs connected to said pump source and at least a second pump source.

In accordance with yet an added feature of the invention, there is provided a pump source control circuit receiving control signals from the control circuits and controlling the power of the at least one common pump source.

In accordance with an additional feature of the invention, there is provided an amplifier unit, which comprises:
the optical amplifiers,
the variable optical attenuators, and
said at least one optical splitter.

In accordance with another feature of the invention, there is provided a second amplifier unit, which comprises:
the optical amplifiers,
the variable optical attenuators, at least said optical splitter, and
a demultiplexer, which outputs are connected to signal inputs of the amplifiers, or a multiplexer, which inputs are connected to signal outputs of the amplifiers.

In accordance with a further feature of the invention, the passive components of the amplifier units are manufactured as Planar Lightwave Circuit and the optical amplifiers are manufactured as optical fibers or Erbium Doped Waveguides.

In accordance with a concomitant feature of the invention, there is provided at least one pump power distribution unit, each pump power distribution unit comprising at least one splitter and variable optical attenuators.

In terms of cost, pump lasers represent the driving element. Thus, the number of pumps must or should be kept as low as possible to significantly reduce the amplification cost at the receiver.

A means to overcome the above mentioned problems is the deployment of a high power pump laser providing pump power to a number of single channel EDFAs. Usually, discrete single channel EDFAs deploy laser pumps emitting in the 980 nm range and providing power values up to about 250 mW. However, in recent years a significant increase in the maximum power available from a single pump has been obtained, so that pump power levels up to 700 mW can be delivered from commercial products. From a cost perspective, the packaging is an important factor and does not vary with the maximum optical power. Thus, the use of a single high power pump laser shared among a group of single channel EDFAs instead of a number of pumps providing the same total power is the most attractive approach.

Furthermore, single channel EDFA usually do not make use of a variable optical attenuator to control the gain, this is achieved by merely acting on the pump current (and therefore on the pump power) level. According to the invention, the control of the pump power cannot be performed by acting on the pump current, since the different EDFAs could require different power levels (e.g. because of different gain values), so that the requirements on the overall pump power could be conflicting ones. To overcome this limitation, VOAs are inserted in the pump path in order to achieve independent setting of the pump power for each channel. For each amplifier, the pump light is then coupled into the EDF by means of a coupler. Nevertheless, the implementation of the proposed setup by means of discrete components will be affected by the drawback given by the insertion loss of the splitter and of the VOAs and the added costs.

However, this is avoided as soon as the proposed configuration is implemented with a planar lightwave circuit approach. By adopting this strategy, the splitter and the VOAs can be integrated on the chip without causing additional losses besides the coupling of the pump power in the PLC. It is to be pointed out that the PLC approach is attractive because of the reduced mechanical dimensions, and the proposed architecture allows for a compact amplifying structure at the receiver deploying a small number of pumps.

Obviously, the approach based on the sharing of the pump among different EDFAs affects the control strategy. For this architecture the control variable is no longer given by the pump current, which determines the pump power value, but rather by the attenuation provided by the VOAs. In principle, the pump laser could be operated at constant maximum output power or at a necessary output power.

Based on the above considerations, the advantages of the proposed solution can be summarized as follows:
  The reduced number of deployed high power pumps leads to a reduction of the costs of the overall amplification structure.
  The implementation based on PLC architecture allows the reduction of the footprint required for the amplification structure. Furthermore, the costs of the required VOAs and WDM couplers will not have a significant influence on the overall costs.

Other features which are considered as characteristic for the invention are set forth in the appended claims.

Although the invention is illustrated and described herein as embodied in an optical amplifier configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
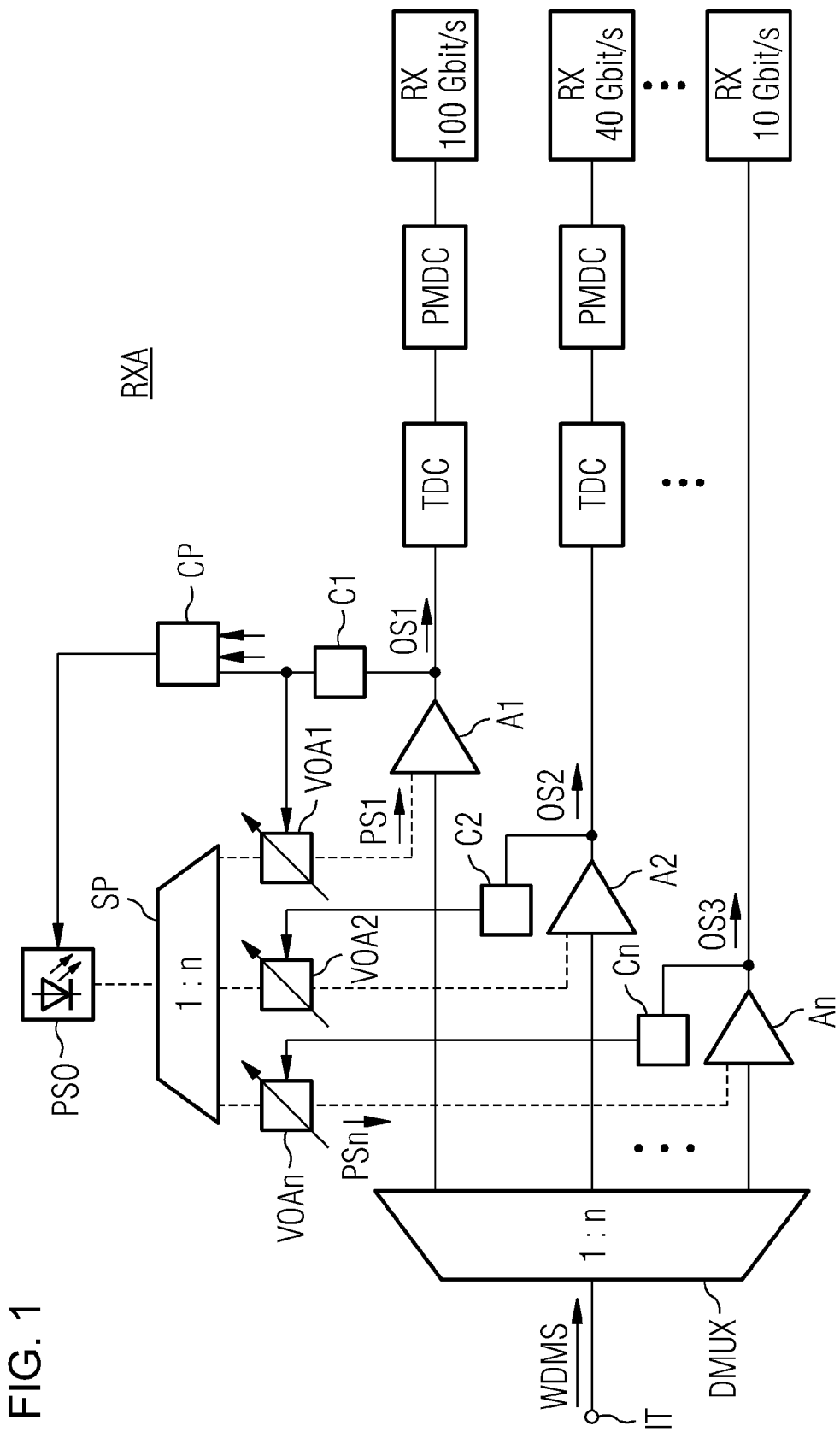
FIG. 1 shows a schematic diagram of an amplifier configuration in a WDM receiver.

Referring now to the figures of the drawing in detail and first, particularly, to FIG. 1 thereof, there is shown a receiver configuration RXA comprising a demultiplexer DMUX receiving a WDM signal WDMS at its input IT and outputting optical signals OS1-OSn. Each optical signal is fed to an associated optical amplifier A1-An. The amplified signals are fed via dispersion compensators TDC and polarisation mode dispersion compensators PMDC or direct to receivers RX (demodulators). The single channels can be used for the transmission of optical signals having different transmission rates, e.g. from 10 Gbit/s to 100 Gbit/s.

Each amplifier A1-An is fed with a separate pump signal. The separate pump signals are derived from a single pump source PSO, whose output signal is separated by a power splitter SP into n separate pump signals PS1-PSn, which are connected via associated VOAs (variable optical attenuators) to pump signal inputs of said amplifiers.

The gain or the output power of the amplifiers is controlled through varying the power of the associated pump signals. In this embodiment small parts of the amplifier output signals are fed via not shown measurement splitters to control circuits C1-Cn. Each control circuit C1-Cn compares the output power with a reference signal and emits an actuating signal varying the attenuation of the associated VOA: VOA1-VOAn and therefore the power of the pump signal PS1-PSn.

A pump control circuit CP receives all the actuating signals from the control circuits C1-Cn. If all VOAs have at least a certain attenuation then the power of the pump source is reduced to extend its lifetime, and the attenuation of the VOAs is modified accordingly.

Figure 2:
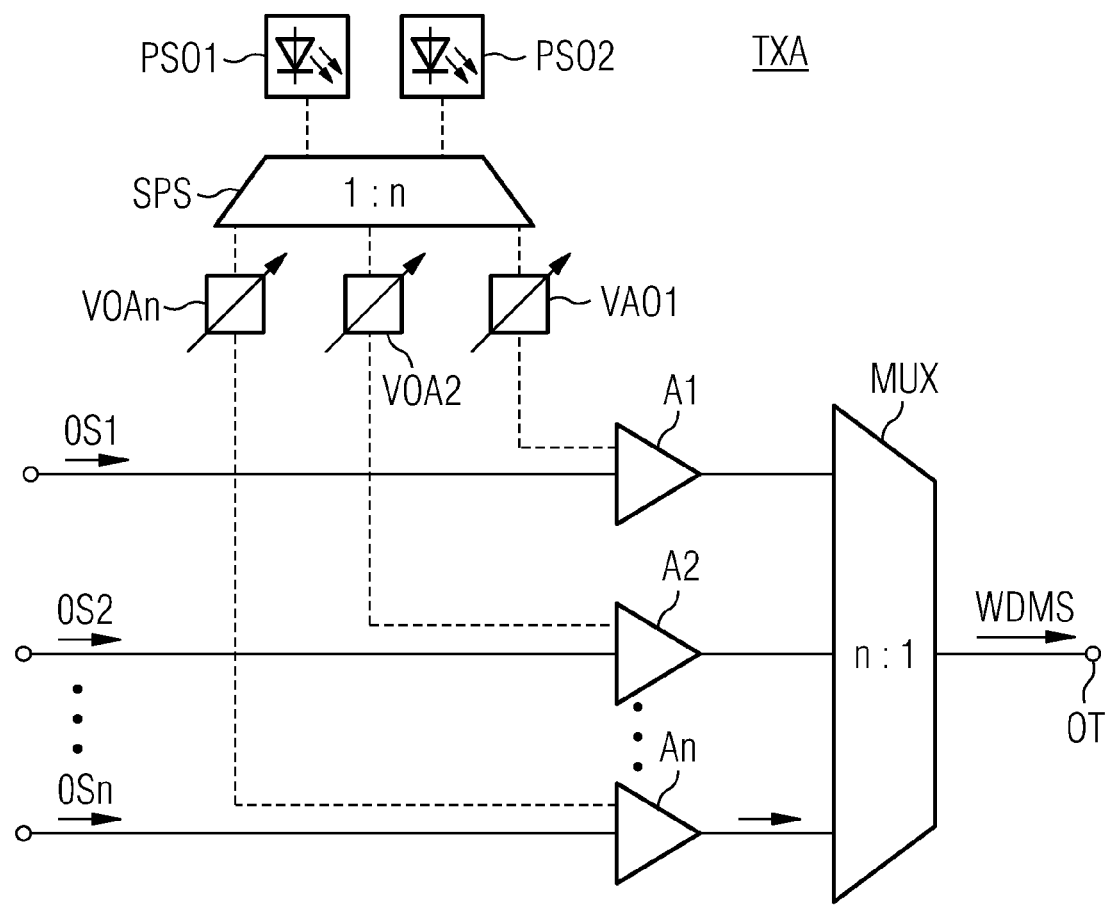
FIG. 2 shows a simplified amplifier configuration in a WDM transmitter.

FIG. 2 shows a transmitter configuration TXA with a plurality of channel amplifiers A1-An. The pump signals are individually controlled by VOAs VOA1-VOAn. The input signals OS1-OSn are separately amplified to equalise different input powers and/or different line attenuations. The amplified optical signals OS1-OSn are combined by a multiplexer MUX and the obtained WDM signal WDMS is transmitted via the output OT.

The pump signals are derived from a plurality of pump sources PS1, PS2, . . . connected to inputs of a special splitter SPS. Pump signal polarization multiplexing and/or pump signal wavelength multiplexing can be applied in all configurations.

The control circuits are not shown in this and in the further embodiments for clarity reasons.

Figure 3:
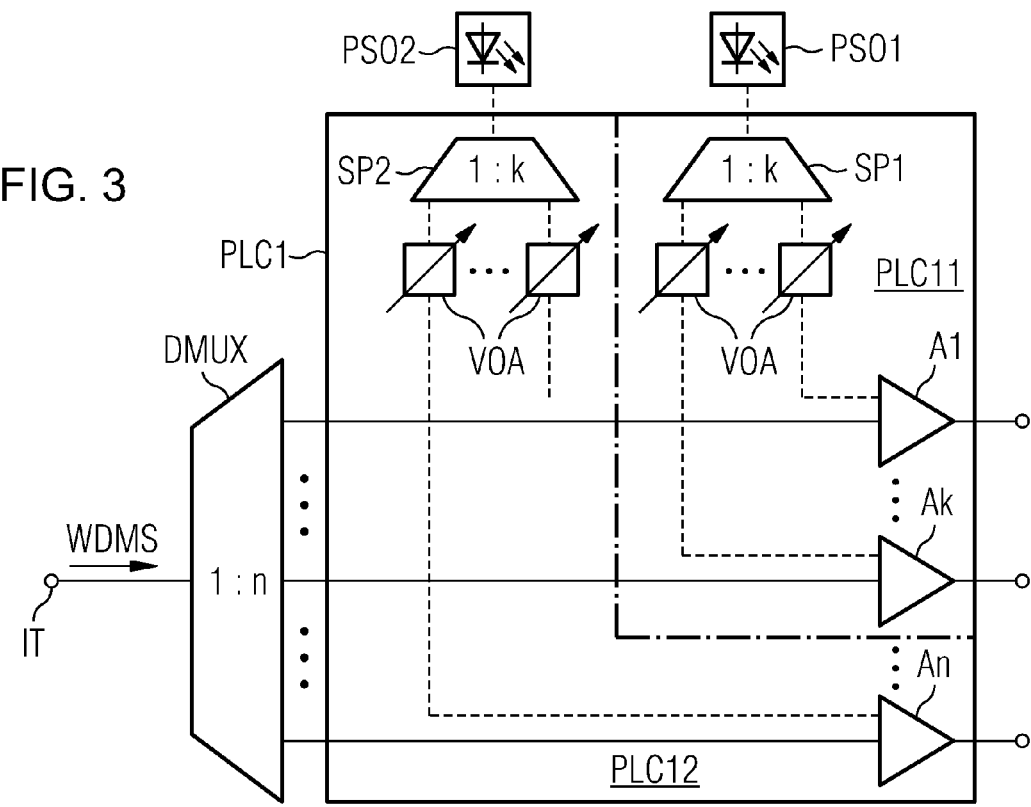
FIG. 3 illustrates a first amplifier unit.

FIG. 3 shows a first amplifier unit PLC1, which is implemented in Planar Lightwave Technology PLC. One, two or more splitters are integrated on the PLC1. Each splitter SP1, SP2, ... receives pump light from a separate pump source PSO1 and PSO2. The VOAs connected to outputs of the splitters and the passive components of the amplifiers are also integrated on the chip. In principle, the gain medium could still be given by the EDF (meaning that only the passive components are integrated on the chip), but a fully integrated approach based on Erbium Doped Waveguides represents an alternative choice.

Inputs of the amplifiers A1, ..., Ak, ..., An are connected to a discrete demultiplexer DMUX and the outputs can be connected to devices compensating impairments such as chromatic dispersion and polarization mode dispersion or directly to the receivers.

According to the number of single channel amplifiers and the maximum available power of the pump sources the shown amplifier unit PLC1 can be split into two or more partial units, e.g. PLC11, PLC12. The first partial amplifier unit PLC11 comprises the amplifiers A1-Ak, and the second partial amplifier unit PLC12 comprises the remaining amplifiers.

Figure 4:
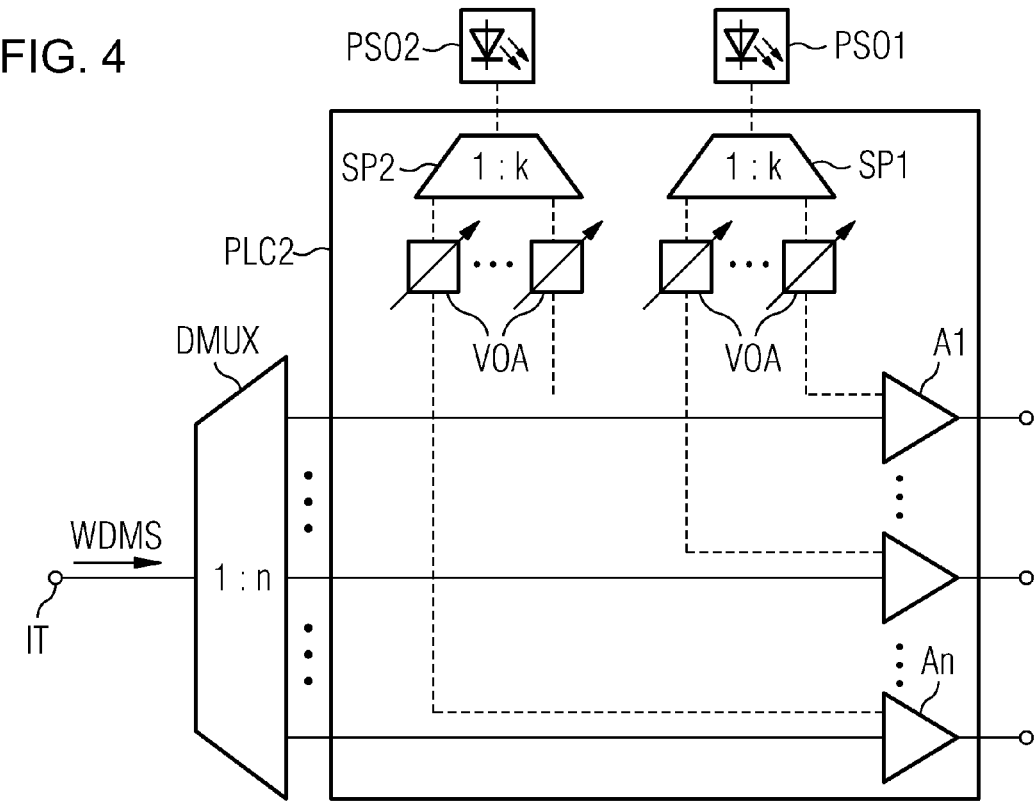
FIG. 4 illustrates a second amplifier unit including demultiplexing functionality.

FIG. 4 shows a second amplifier unit PLC2 with an integrated demultiplexer DMUX. The number of connecting points is considerable reduced by this implementation.

Figure 5:
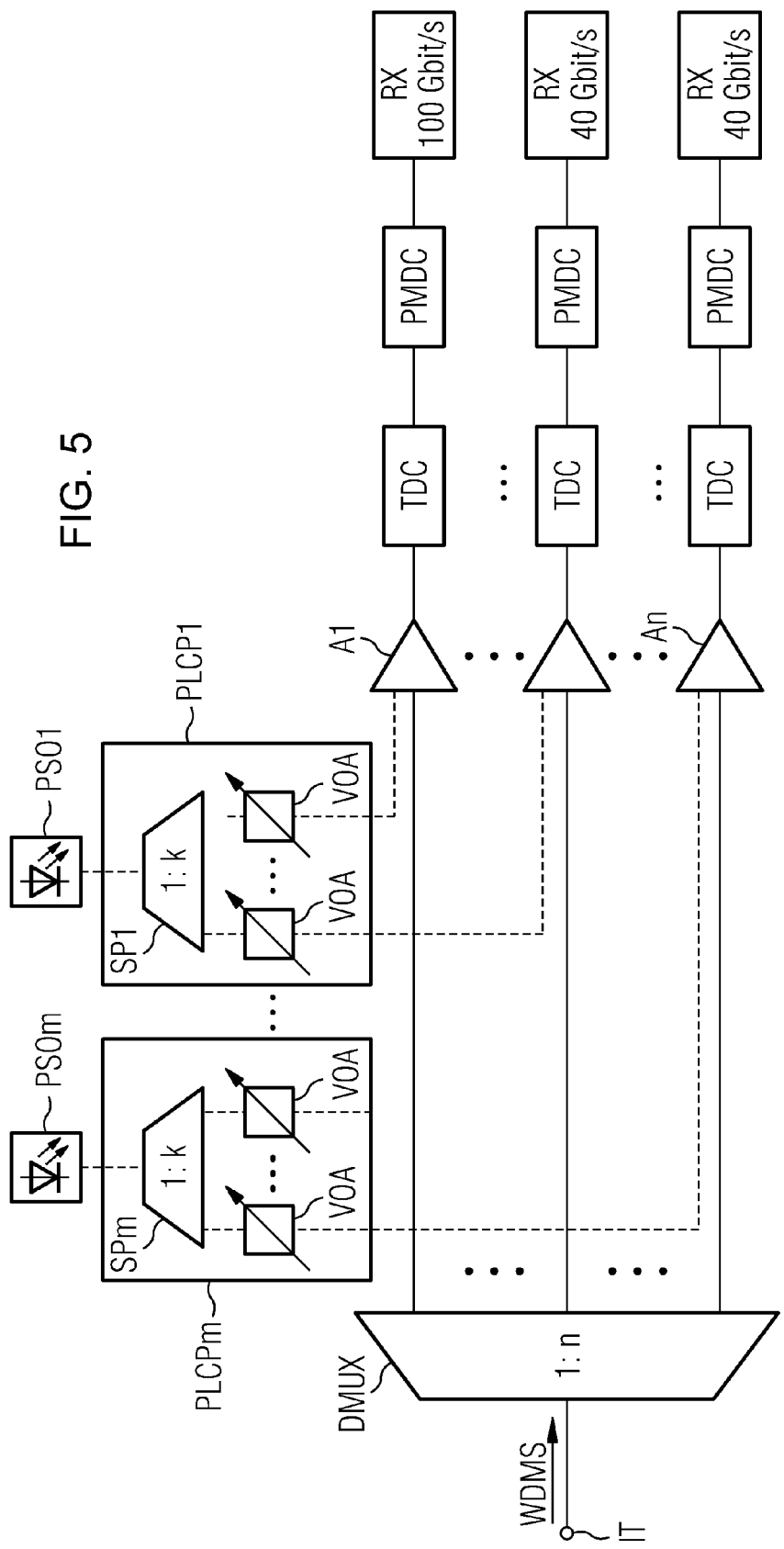
FIG. 5 illustrates a pump signal distribution unit at the receiver side.

FIG. 5 shows pump power distribution units PLCP1-PLCPm in a receiver configuration described before. Each pump power distribution unit PLCP1-PLCPm comprises a splitter SP1-SPm and VOAs connected to the splitter outputs. The input of each splitter is connected to an associated pump source PSO1-PSOm. The use of separate pump power units is advantageous for receivers and transmitters with a huge number of amplifiers, because of the fact that the cost scales with the number of active channels. Usually, WDM systems are put into operation with a small number of channels and the channel count is progressively increased later on. Thus, the initial investment associated to the scheme of FIG. 5 is determined by the number of activated channels at Begin-Of-Life rather than by the full channel load. As a consequence, this solution is attractive in terms of the cost evolution from Begin-Of-Life to End-Of-Life.

The invention claimed is:

1. An optical amplifier configuration for wavelength division multiplex systems, comprising:
   an optical splitter having an input and a plurality of outputs;
   a first common pump source connected to said input of said optical splitter;
   a plurality of variable optical attenuators;
   a plurality of optical amplifiers having pump signal inputs connected via said optical attenuators to said outputs of said optical splitter respectively;
   a plurality of control circuits connected to receive control signals from said amplifiers and to control output powers of said variable optical attenuators and therefore pump signals of said amplifiers; and
   a pump source control circuit receiving control signals from said control circuits to control a power of said common pump source, and to reduce the power of said common pump source if all said variable optical attenuators have at least a certain attenuation.

2. The amplifier configuration according to claim 1, which further comprises at least one additional optical splitter having an input connected to at least one second pump source and having outputs connected to pump signal inputs of further amplifiers.

3. The amplifier configuration according to claim 1, which comprises a splitter having at least two inputs connected to said pump source and at least one second pump source, respectively.

4. The amplifier configuration according to claim 1, wherein said optical amplifiers, said variable optical attenuators, and said at least one optical splitter together form an amplifier unit.

5. The amplifier configuration according to claim 4, wherein passive components of said amplifier unit are formed as a planar lightwave circuit and said optical amplifiers are formed as optical fibers or erbium-doped waveguides.

6. The amplifier configuration according to claim 1, which comprises an amplifier unit comprised of:
   said optical amplifiers;
   said variable optical attenuators;
   said at least one optical splitter; and
   a demultiplexer with outputs connected to signal inputs of said amplifiers, or a multiplexer with inputs connected to the signal outputs of said amplifiers.

7. The amplifier configuration according to claim 1, which comprises at least one pump power distribution unit including at least one said splitter and said variable optical attenuators.

8. The amplifier configuration according to claim 1, which comprises a plurality of pump power distribution units each including at least one splitter and variable optical attenuators.

* * * * *